United States Patent [19]
Butcher

[11] 3,773,585
[45] Nov. 20, 1973

[54] METHOD OF FORMING A LAMINATE STRUCTURE

[75] Inventor: Louis M. Butcher, New Kensington, Pa.

[73] Assignee: Aluminum Company of America, Pittsburgh, Pa.

[22] Filed: Sept. 10, 1971

[21] Appl. No.: 179,514

[52] U.S. Cl.............. 156/192, 156/199, 156/211, 156/229, 156/259, 156/271, 156/324, 29/25.42, 29/605, 317/258
[51] Int. Cl....................... H01g 13/00, B31c 13/00
[58] Field of Search................ 156/298, 301, 299, 156/244, 229, 222, 199, 211, 259, 271, 324; 117/10; 264/137, 135; 29/527.4, 527.2, 605, 25.42; 317/258

[56] References Cited
UNITED STATES PATENTS

| | | | |
|---|---|---|---|
| 3,477,126 | 11/1967 | Price | 156/299 X |
| 3,589,975 | 6/1971 | Andrews et al. | 156/244 X |
| 2,539,690 | 1/1951 | Boorn | 156/298 X |
| 3,159,516 | 12/1964 | Harris | 156/244 X |

Primary Examiner—Alfred L. Leavitt
Assistant Examiner—Basil J. Lewris
Attorney—Arnold B. Silverman

[57] ABSTRACT

A method of forming a laminate including providing an elongated laminate strip having a metal ply and a layer of a thermoplastic material bonded thereto with the metal ply and thermoplastic layer initially having a substantially equal width. Compressively reducing the thickness of the thermoplastic layer and simultaneously establishing transverse enlargement of the thermoplastic layer in both transverse directions to cause the thermoplastic layer to extend farther outwardly than the metal ply. The thickness reduction and transverse expansion may be effected at a laminate temperature of about 250° to 600° F. The reformed laminate may subsequently be coiled in order to establish an electrical coil having insulation between edges of adjacent wraps of the metal ply.

3 Claims, 3 Drawing Figures

Patented Nov. 20, 1973

3,773,585

METHOD OF FORMING A LAMINATE STRUCTURE

BACKGROUND OF THE INVENTION

1. Field of the Invention

This invention relates to a method of establishing a laminate structure having a metal ply and a layer of thermoplastic material which has a greater width than the metal ply. More specifically, the invention relates to a method of providing an adhesively bonded laminate wherein the thermoplastic layer has a transverse width sufficiently greater than the width of the metal ply to effectively electrically insulate adjacent metal wraps of a coil established from this material.

2. Description of the Prior Art

It is frequently desired to provide a laminate of an elongated metal strip and a wider thermoplastic layer, such as a film or a coating. One end use where this characteristic is desired is in connection with electrical coils, which are made from strip conductors, such as solenoids, capacitors and transformers. For such an end use it is essential to have the dielectric project transversely outwardly from the coil in order to prevent undesired edge to edge shorting between adjacent conductive wraps of the coil.

It has been known to provide such a structure by bonding a relatively narrow metal strip to a wider plastic film. See U.S. Pat. Nos. 3,303,550 and 3,477,126. The disadvantage of such structures is that not only is one precluded from taking maximum advantage of conventional laminating technology, but also there is presented the need for providing additional process steps and additional handling of the metal strip. Such an approach is not only economically undesirable, but is also time consuming.

There remains, therefore, a need for a method of producing a metal strip which is bonded to a thermoplastic layer in such a fashion as to provide transverse projection of the thermoplastic layer outwardly beyond both edges of the metal strip.

SUMMARY OF THE INVENTION

The present invention has met the above described need by providing an elongated laminate strip which has a metal ply and a layer of thermoplastic material bonded thereto. The metal ply and thermoplastic layer are of substantially equal width initially. Transverse enlargement of the thermoplastic layer is established by compressively reducing the thickness of the thermoplastic layer. This is preferably accomplished when the laminate is at an elevated temperature of about 250° to 600° F. The reduction in thickness of the thermoplastic layer is preferably about 2 to 10 percent and the transverse expansion of the thermoplastic layer is preferably about 3 to 25 percent. The compressive reduction may conveniently be effected by passing the laminate through a pair of heated nip rolls having a temperature of about 250° to 600° F. After the transverse expansion has been effected, the product may conveniently be wrapped on a spool for storage and/or shipment or it may be introduced directly into the end use environment, as by creating an electrical coil.

It is an object of this invention to provide a means of converting a metal-thermoplastic material laminate with both components having a substantially equal initial width into a laminate structure wherein the thermoplastic material has a greater width.

It is another object of this invention to provide such a method wherein the conversion to a laminate having components of different widths is readily effected in an economical fashion without the need for a substantial investment in conversion equipment and also without the need to employ a number of time consuming processing steps.

It is yet another object of this invention to produce such a laminate by a method which is compatible with conventional multiple width laminating techniques and slitting apparatus.

These and other objects of the invention will be more fully understood from the following description of the invention, on reference to the illustrations appended hereto.

DESCRIPTION OF THE PREFERRED EMBODIMENTS

Figure 1:
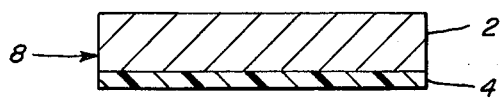
FIG. 1 is a cross sectional illustration of the laminate prior to processing in accordance with this invention.

Referring now more specifically to FIG. 1, there is shown a laminate structure consisting of a metal ply 2 and a thermoplastic layer 4 which is bonded thereto. It is noted that the metal ply 2 and the thermoplastic layer 4 have a substantially equal width. While for purposes of simplicity of description the laminate shown in FIG. 1 will be regarded as an individual width laminate strip, it will be appreciated that the invention is adapted for use with conventional laminating techniques which would generally result in the initial establishment of a multiple width laminate which would subsequently be slit into a number of individual laminate strips.

While depending upon the specific end use contemplated a variety of types of metal might be employed, for purposes of illustration the present description will center around the use of a conductive metal ply in a laminate strip which is intended ultimately to be converted into an electrical coil. It will be appreciated, however, that the invention is not so limited. The metal ply will preferably be composed of an electrically conductive material, such as aluminum or copper, for example, having a gauge of about 0.00014 inch to about 0.010 inch. The gauge employed, to a great extent, will be determined by the specific end use contemplated. The thinner gauges will generally be employed for electrical coils, such as capacitors, while coils such as heavy duty transformers would require the thicker gauges.

The thermoplastic layer 4, for electrical coil uses, may be any of a number of suitable thermoplastic materials and may conveniently be provided as a film or coating. It will preferably be provided in a thickness of about 0.00015 to 0.005 inch. Among the suitable materials are polyolefins, polyamides and rubber. Polyethylene, vinyl, polyvinyl chloride, polyester, polystyrene and polycarbonate are among the preferred materials.

The thermoplastic material may be either self-adhered to the metal strip or adhered by means of an appropriate adhesive such as thermoplastics, including polyurethane, epoxies, polyesters, vinyls and polyamides, or hot melts such as paraffin waxes, microcrystalline waxes, natural waxes and asphalt and coal tar based products.

Figure 2:
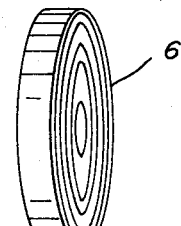
FIG. 2 is a schematic illustration of one means of practicing the method of this invention.
Figure 3:
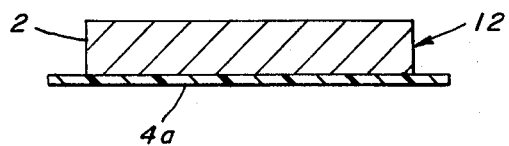
FIG. 3 is a cross sectional illustration of a product of the method of this invention.
Figure 3:
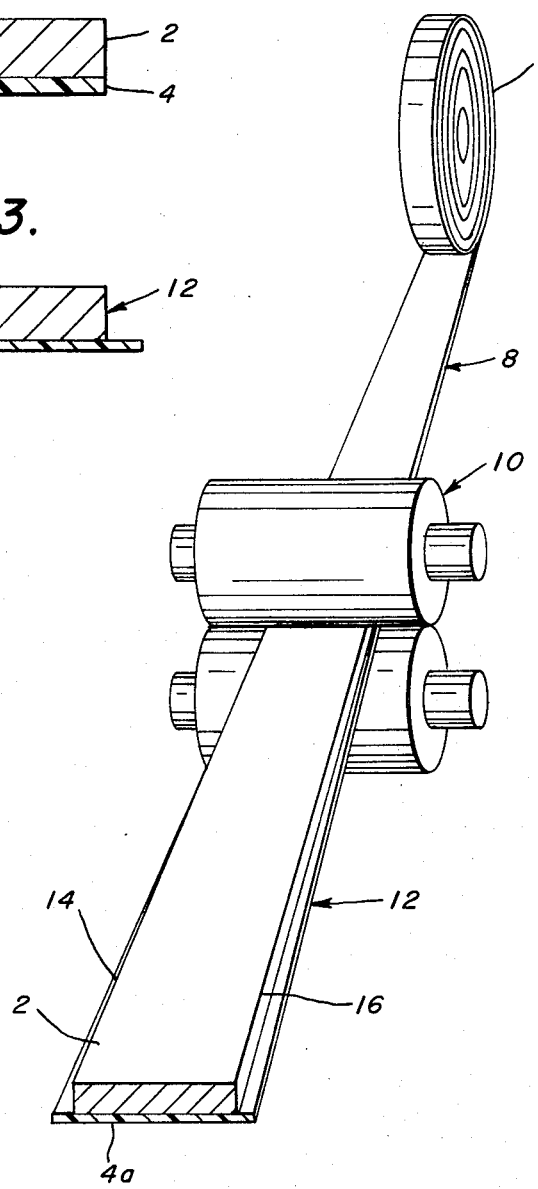

Referring now to the schematic illustration shown in FIG. 2, there is seen a coil 6 of the laminate material shown in FIG. 1. It will be appreciated that while the source of the laminate material has been shown as being a coil, the material may be supplied from the slitter or by other means and need not be supplied from a coil. The laminate 8 shown on the entry side of nip rolls 10 has a cross sectional configuration generally like that illustrated in FIG. 1. As is shown in FIG. 3, the processed laminate 12 emerging from nip rolls 10 has the metal ply 2 of substantially identical width as in laminate 8, but has thermoplastic layer 4a which has a transverse width greater than metal ply 2 and projects outwardly beyond both edges 14, 16 of metal ply 2.

In one form of the invention, the laminate is reformed while it is at an elevated temperature, which is preferably about 250° to 600° F. A preferred manner of controlling the temperature of the laminate during working is to employ heated nip rolls 10 which have a temperature of 250° to 600° F established in a conventional manner.

Reforming the laminate preferably results in the metal ply 2 retaining its initial width and thickness, while the thermoplastic layer is reduced in thickness by about 2 to 10 percent and is increased in transverse width by about 3 to 25 percent. Such a reformed structure is shown in FIG. 3. The degree of transverse projection of the thermoplastic layer 4a may readily be controlled by adjusting the compressive force applied to the laminate and the forming temperature. In addition, the choice of thermoplastic material and initial thickness of the same can produce further control over the extent of transverse expansion.

The processed laminate 12 may subsequently be wound onto a storage reel or converted directly into the final product. In the event that the final product is to be an electrical coil, one need merely wind the material into a coil in a conventional fashion, without the need to provide any special handling for the thermoplastic layer 4. As a result of its transverse projection in both directions, it will automatically provide the desired electrical insulation between edges of adjacent wraps of the coil and effectively prevent undesired edge to edge shorts.

In the preferred form of the invention the thermoplastic layer 4 will be longitudinally continuously bonded to the metal ply 2. It will also preferably be transversely bonded over at least a major portion of the width of the metal ply 2 and may be coextensively transversely bonded, if desired.

Example

In order to consider a more specific application of this invention an example will be provided. A multi-width aluminum foil member having a thickness of 0.001 inch is adhesively bonded to a polyester film having a thickness of about 0.0009 inch by means of a layer of a polyurethane adhesive. The foil member is slit into a number of laminate strips each having foil and polyester plies of substantially identical transverse width. The laminate strip is subjected to compressive force by passing it through a pair of mated nip rolls which have a temperature of about 550° F. The emerging reformed laminate is found to have the foil strip having essentially its initial dimensions and the polyester layer having a thickness of about 0.0008 inch and an increase in transverse width of about 6 percent.

It will, therefore, be appreciated that the present invention provides a method for economically and effectively establishing a bonded metal ply-thermoplastic laminate wherein the thermoplastic has a greater transverse width than the metal ply. This is accomplished by compressively reforming the laminate in order to thin and transversely expand the thermoplastic layer. All of this is accomplished without the need for investing in complex additional processing equipment and while making full use of conventional laminating and slitting techniques. In the event that the end use of the product is to be an electrical coil, the winding of such coils may readily be effected immediately following the reforming of the laminate. Alternately, the laminate may be coiled for storage if desired.

Whereas particular embodiments of the invention have been described above for purposes of illustration, it will be evident to those skilled in the art that numerous variations of the details may be made without departing from the invention as defined in the appended claims.

I claim:

1. A method of reforming a laminate consisting of
   providing an elongated laminate having a substantially continuous metal ply and a layer of a substantially continuous thermoplastic material bonded thereto with said metal ply and said thermoplastic layer having a substantially equal width,
   slitting said laminate to establish a number of individual strips each having a metal ply coextensively bonded to a thermoplastic ply, and
   compressively reducing the thickness of said thermoplastic layer while maintaining said laminate strip at an elevated temperature of from about 250° to 600° F, and simultaneously establishing transverse enlargement of said thermoplastic layer in both transverse directions to cause said thermoplastic layer to expand to a greater width than said metal ply width.

2. The method of claim 1 including
   said thermoplastic layer is adhesively bonded to said metal ply prior to effecting said reduction,
   reducing said thickness of said thermoplastic layer by about 2 to 10 percent, and
   transversely expanding said thermoplastic layer by about 3 to 25 percent.

3. The method of claim 1 including
   after establishing said reduction in thickness and said increase in transverse width winding said laminate to establish an electrical coil with said thermoplastic material serving to electrically insulate edges of adjacent wraps of said metal ply.

* * * * *